Figure 1:
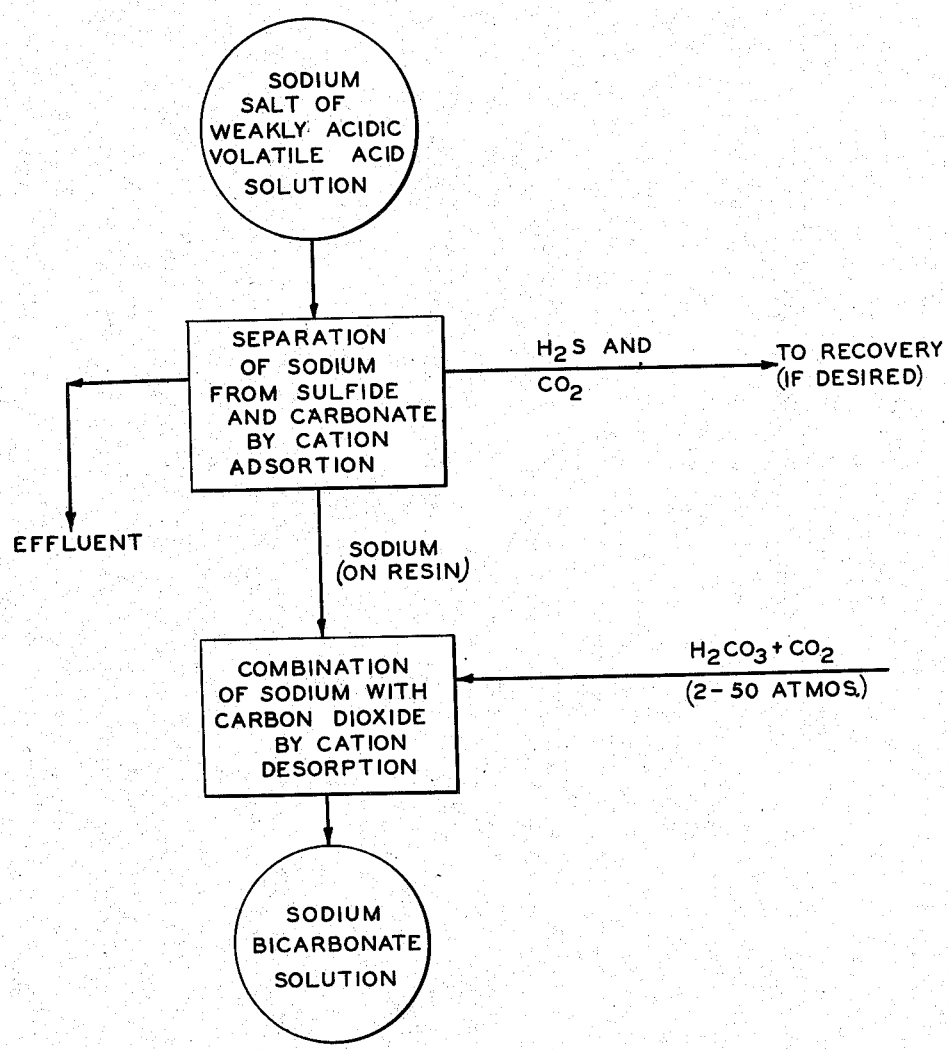

Oct. 20, 1953

K. R. GRAY ET AL
PREPARATION OF SODIUM SALTS OF
CARBONIC ACID BY ION EXCHANGE 2,656,245

Filed July 15, 1950

2 Sheets-Sheet 1

FIG. I

INVENTORS
Kenneth Russell Gray
Hartzell Lance Crosby
BY
Pennie, Edmonds, Morton & Barrows
ATTORNEYS Patented Oct. 20, 1953

2,656,245

UNITED STATES PATENT OFFICE 2,656,245

PREPARATION OF SODIUM SALTS OF CARBONIC ACID BY ION EXCHANGE

Kenneth Russell Gray and Hartzell Lance Crosby, Shelton, Wash., assignors to Rayonier Incorporated, Shelton, Wash., a corporation of Delaware Application July 15, 1950, Serial No. 174,104

9 Claims. (Cl. 23—64)

This invention relates to the production of chemicals and more particularly to the conversion of soda salts into other useful forms. The invention provides a process involving ion exchange for coverting sodium salts of weakly acidic volatile acids into useful chemicals. The invention may be applied in the treatment and recovery of chemicals from natural deposits of soda salts, such as natural brines or mineral deposits, smelts from the combustion of waste liquors from pulping operations and the like.

The invention provides efficient processes for the preparation of sodium salts of carbonic acid from a sodium salt of hydrogen sulfide, and for the preparation of sodium bicarbonate or carbonate in a relatively pure form from mixtures of crude salts containing either sodium carbonate or bicarbonate, or both. In another embodiment the invention provides a simple, direct, economical process for the preparation of alkaline digestion liquors from a smelt obtained by the combustion of waste liquors containing sodium resulting from the digestion of lignocellulosic material with acidic, neutral or alkaline treating liquors.

We have made the important discovery that by treating a solution containing at least one sodium salt of a weakly acidic volatile acid such as sodium sulfide or sodium carbonate, with a cation exchange resin having active exchange centers which are substantially due to phenolic hydroxyl groups or carboxylic acid groups and which are in hydrogen form, a substantial portion of the volatile acid (e. g. $H_2S$ and/or $CO_2$) is evolved in gaseous form and sodium is adsorbed on the resin. By treating the resin containing the adsorbed sodium with carbonic acid, a solution containing sodium bicarbonate is formed and the resin regenerated in form for reuse.

Where the solution containing the sodium salt of weakly acidic volatile acids also contains the sodium salts of relatively non-volatile, strong acids, the resin treatment will adsorb the sodium component of only the weakly acidic volatile acids. Thus, since the weakly acidic volatile acids are liberated from the solution in gaseous form and the sodium is adsorbed on the resin, sodium salts of carbonic acid may be obtained completely free from the sodium salts of the relatively non-volatile, strong acids.

Ion exchange resins are in general porous, cross-linked polymeric materials which contain ionizable groups throughout the resin which are capable of exchanging one ion for another. They may thus be considered to be solid gel structures of an ionic nature.

The process of the invention is not limited to any particular manner of preparation of the phenolic hydroxyl or carboxylic acid type ion exchange resins used. Some methods whereby satisfactory weakly acidic resins may be prepared follow.

Phenolic hydroxyl-type ion exchange resins may be prepared by polymerizing phenols (preferably polyphenols) to give a porous cross-linked polymer, as, for example, by use of suitable amounts of formaldehyde. Naturally occurring tannins provide an economically attractive source of polyphenols for this purpose. Alternatively, phenolic hydroxyl groups may be produced in naturally occurring polymeric materials not containing appreciable amounts of this group by such means as hydrolysis of phenol-ether or ester groups in the original molecule. Again, in such cases where necessary to obtain insolubility, prior, concurrent, or subsequent cross-linking will be effected.

Carboxylic acid type resins may be prepared by polymerizing or co-polymerizing unsaturated organic acids or their anhydrides under conditions whereby cross-linked polymers are formed. Alternatively esters of unsaturated organic acids may be polymerized to form a cross-linked resin and later saponified. Again, non-cross-linked alkali - soluble polymers containing carboxyl groups may be subjected to a cross-linking reaction to prepare an insoluble ion exchange resin. Again, carboxylic acid groups may be introduced into natural polymers not already containing these groups. In such cases where necessary to obtain insolubility, prior, concurrent or subsequent cross-linking treatment would be effected. Introduction of carboxyl groups would be effected by such means as substitution of carboxy-alkyl groups or by partial oxidation of the original structure.

Ion exchange resins containing both carboxylic acid and phenolic hydroxyl groups may be prepared by polymerizing simple molecules containing both carboxyl and phenolic hydroxyl groups. Alternatively, such resins may be prepared by subjecting polymeric materials containing phenolic hydroxyls as the only exchange group to procedures whereby carboxylic acid groups are introduced in addition to the phenolic hydroxyl groups. Here also, where necessary to obtain insolubility, prior, concurrent, or subsequent cross-linking will be effected.

Among the resins we have found particularly applicable in our process are those containing phenolic hydroxyl or carboxylic acid exchange centers, or both, and in particular, condensation products of phlobatannins. Resins which we have found particularly suitable are condensation products formed by heating quebracho tannin or hemlock tannin with formaldehyde under acidic conditions.

Through use of a resin containing as active exchange centers principally phenolic hydroxyl groups, quite complete removal of the adsorbed sodium from the resin (i. e. quite complete regeneration) can be effected by means of carbonic acid. When the resin contains in place of or in addition to the phenolic groups a substantial number of carboxylic acid groups, complete removal of the sodium by means of carbonic acid may not be achieved; however a practical working cycle can be obtained by use of a high capacity resin. In effect only a certain proportion of the carboxylic acid groups will thus react as active exchange centers; the rest of the carboxylic acid groups remain saturated with sodium and may therefore be considered as inert.

The sodium adsorption step may very advantageously be conducted at an elevated temperature, as, for example, 50–100° C., whereby the effective capacity of the resin is not only materially increased due to thermal effects but also due to the reduced solubility of the evolved volatile acids. Thus the volatile reaction product (e. g. $H_2S$ or $CO_2$ or both) is effectively removed from the solution enabling very rapid approach to equilibrium conditions and facilitating adsorption of the sodium. Removal of the volatile acid may also be further facilitated by carrying out this step under vacuum.

Following the adsorption step, the resin is washed in a conventional manner and the adsorbed sodium removed by a treatment with carbonic acid solution under carbon dioxide pressure. We have found that carbonic acid of a practical concentration may be prepared by reacting water with $CO_2$ at from 2–50 atmospheres carbon dioxide pressure. This carbonic acid may be prepared in advance of its use in the process and maintained under $CO_2$ pressure. conversely, it may be desirable to form the carbonic acid in situ by treating the wet resin containing sodium, or an aqueous slurry of such resin, with $CO_2$ under pressure. We have effected complete removal of the sodium from the resin in a number of experiments by treating a water slurry of the sodium containing resin with $CO_2$ at 275 lbs. per square inch absolute. The temperature of this step is not critical, although it is obvious that cooling will permit use of lower pressures to arrive at a given final carbonic acid concentration.

The time of reaction in this sodium removing step is a function of the strength of carbonic acid used, the degree of sodium removal required, and the characteristics of the particular equipment, i. e., whether or not agitation or circulation is employed and whether the operation is conducted in a column by leaching or whether the resin is simply slurried with the carbonic acid.

We have also carried out our invention by treating wet, drained resin containing adsorbed sodium with $CO_2$ under pressure, thereby forming sodium bicarbonate on the resin. By leaching this resin mass with water a solution has been obtained containing up to 46 gms. per liter sodium bicarbonate.

It is a desirable feature of our process that many impurities present in the original solution remain in the liquor drained from the resin following the sodium adsorption step and therefore the regenerated solution or product liquor is recovered as a high quality material.

In the application of our process to sulfide solutions, the sulfide content of the influent solution is largely released as hydrogen sulfide during the soda adsorption stage. This hydrogen sulfide is combustible over a wide range of concentrations and may be readily converted to sulfur dioxide or elemental sulfur for process use as such or for conversion to sulfuric acid.

In the application of the process to solutions containing either or both sulfides and carbonates, the solution, from which all or a portion of the sodium has been removed, is drained from the resin at the completion of the adsorption step. This said effluent solution has been termed by us the "leakage," and the term "leakage" is hereinafter used in the specification in this sense.

In one method of applying our process, the ratio of the amount of resin used in the treatment to the amount of soda salts of the weakly acidic volatile acids is such that substantially all of the soda of the influent solution is adsorbed on the resin and substantially all of the volatile acids are liberated in gaseous form. The leakage from this process, containing substantially no sodium ions may be readily stripped of any remaining traces of volatile hydrogen sulfide and may therefore be reused as water in the process or discarded with no attendant waste disposal problem.

Frequently in applying our process, the sodium containing solution influent to the resin treatment contains, in addition to the soda salts of weakly acidic volatile acids, other soda salts, such as soda salts of strong acids, which are not decomposed in the exchange reaction and therefore remain in the leakage.

By limiting the ratio of influent liquor to resin, relatively complete removal of the soda from the salts of the weakly acidic volatile acids may be achieved, in which case the leakage contains largely the sodium salts of the relatively non-volatile acids and may be either recycled in the process, treated for recovery of the inactive soda values, or discarded.

Practically it may be advantageous to treat the resin with an influent liquor containing salts of the weakly acidic volatile acids substantially in excess of the effective capacity of the resin, often in the presence of sodium salts of relatively non-volatile acids. In such case the leakage will contain substantially the total amount of any sodium salts of the relatively non-volatile acids as well as the unadsorbed portion of the soda salts of the weakly acidic volatile acids. Operation in this manner provides a very high sodium ion concentration in the influent solution throughout the reaction stage, thereby resulting in exceptionally high effective capacities and efficient use of the resin. The leakage from such operation would contain considerable sodium values and could be recycled, treated for further sodium recovery, or used elsewhere in the process.

Our invention is of great significance as regards the manufacture of pulp. In the acid sulfite pulping process a lignocellulose material is generally digested in a solution of sulfurous acid, part of the sulfurous acid being combined as bisulfite. The cation combined thus with the bisulfite ion is known as the pulping base. In the past, for economic reasons, this pulping base has almost universally been calcium.

On the other hand, in the alkaline pulping industries, the desirability of the use of sodium as a pulping base has long been recognized. Advantage is taken of the high solubility properties and the economic recovery of the base for reuse.

For over a century, it has been standard practice in the alkaline pulping industries to recover the base (sodium) by combusting the organic matter. On the other hand, although soda-base waste liquors containing sulfites can be readily burned to yield a soda smelt, it has not been heretofore practically possible to convert the smelts so obtainable to a form suitable for use in sulfite digestion liquors or in the preparation of alkaline digestion liquors of the desired sulfidity. Development of such conversion processes would give the following great advantages:

1. It would be technically and economically practical to practice two-stage pulping sequences wherein an alkaline digestion is preceded by a digestion with an acid sulfur-containing liquor (e. g. sulfurous acid, sodium bisulfite or sodium bisulfite-sulfurous acid solution).

2. Heat equivalent to a large amount of oil would be obtained, since the organic matter in the waste liquor from both digestions will provide 8–9000 B. t. u. per lb. dry organic solids or considerably in excess of the heat required for the multiple effect evaporation of the liquor to a concentration suitable for burning.

3. By allowing the waste and sulfur containing liquor to be combusted with the waste alkaline digestion liquor, effluent liquors requiring disposal would be practically eliminated.

4. Recovery of chemicals for re-use would provide operating cost advantages.

Our invention provides a simple practical process for converting a smelt containing sodium sulfide into a solution of sodium salts of carbonic acid or into neutral sodium sulfite solution either free from, or having a minimum quantity of objectionable by-products. One application of this provides for converting a portion of the smelt solution containing sodium sulfide into a solution of sodium salts of carbonic acid which may be recombined with the balance of the smelt solution thereby lowering its sulfidity to a point desirable for preparing alkaline digestion liquor and also provides recovery of hydrogen sulfide which may be utilized in the production of acid digestion liquor.

In the kraft and soda pulping industries it has been standard practice to recover the base as a smelt by combusting the organic matter. While the recovered smelt is not directly utilizable in the preparation of digestion liquor, its conversion to a usable form is relatively simple, involving essentially the conversion of the carbonate content to hydroxide by causticization with lime. However, no satisfactory method exists for recovering digestion liquors from smelt when the alkaline digestion is preceded by a treatment with an acid sulfur-containing material or when sodium sulfite is a component of the alkaline digestion liquor.

When wood is digested with sulfurous acid, acid sulfite, hydrogen sulfide, or hydrosulfide preceding an alkaline digestion, sulfur is introduced into the alkaline waste liquor through carry-over in the chips and associated liquor or through the intentional combination of the waste liquors to facilitate evaporation and combustion. This sulfur will appear in the smelt as sulfide and can result in a regenerated alkaline liquor with a higher sulfide content than desired, as well as result in failure to recover chemicals suitable for the acid digestion. Also, when sodium sulfite is employed as a constituent of the alkaline digestion liquor itself, the resulting smelt cannot be simply causticized for re-use as the digestion liquor, since such smelt will contain a high sulfide content and very little sulfite.

Our invention provides a simple ion exchange process for converting smelt containing sodium sulfide into forms suitable for the preparation of alkaline digestion liquors in a two-stage pulping process employing an acid digestion with sulfurous acid, acid sulfite, hydrogen sulfide or hydrosulfide followed by alkaline digestion. The invention also provides a solution phase process for treating the sodium sulfide smelt from the combustion of waste liquor from treating processes using alkaline digestion liquors containing sodium sulfite.

We have discovered that the waste acid and alkaline effluents from a two-stage pulping process may be combined for evaporation and burned in a comomn furnace and that both acid and alkaline digestion liquors may be regenerated from the single smelt obtained. Further, we have discovered marked technical and economical advantages in so doing over combustion of the sulfite waste liquor separately. Since a single evaporator and furnace installation is required, control and operation are greatly simplified. The excess soda normally present in the waste alkaline digestion liquor will result in (1) partial neutralization of the acid liquor, thereby reducing evaporator corrosion, (2) increased sulfur recovery will be achieved through retention of the sulfur in the smelt, and (3) a reduction of the melting point of the resulting smelt through increasing the carbonate content, thus simplifying the furnace operation and maintenance.

The invention is applicable to a variety of pulping operations. Many such operations proposed in the past have not heretofore been practical but are now rendered economically feasible by use of this invention.

Figure 2:
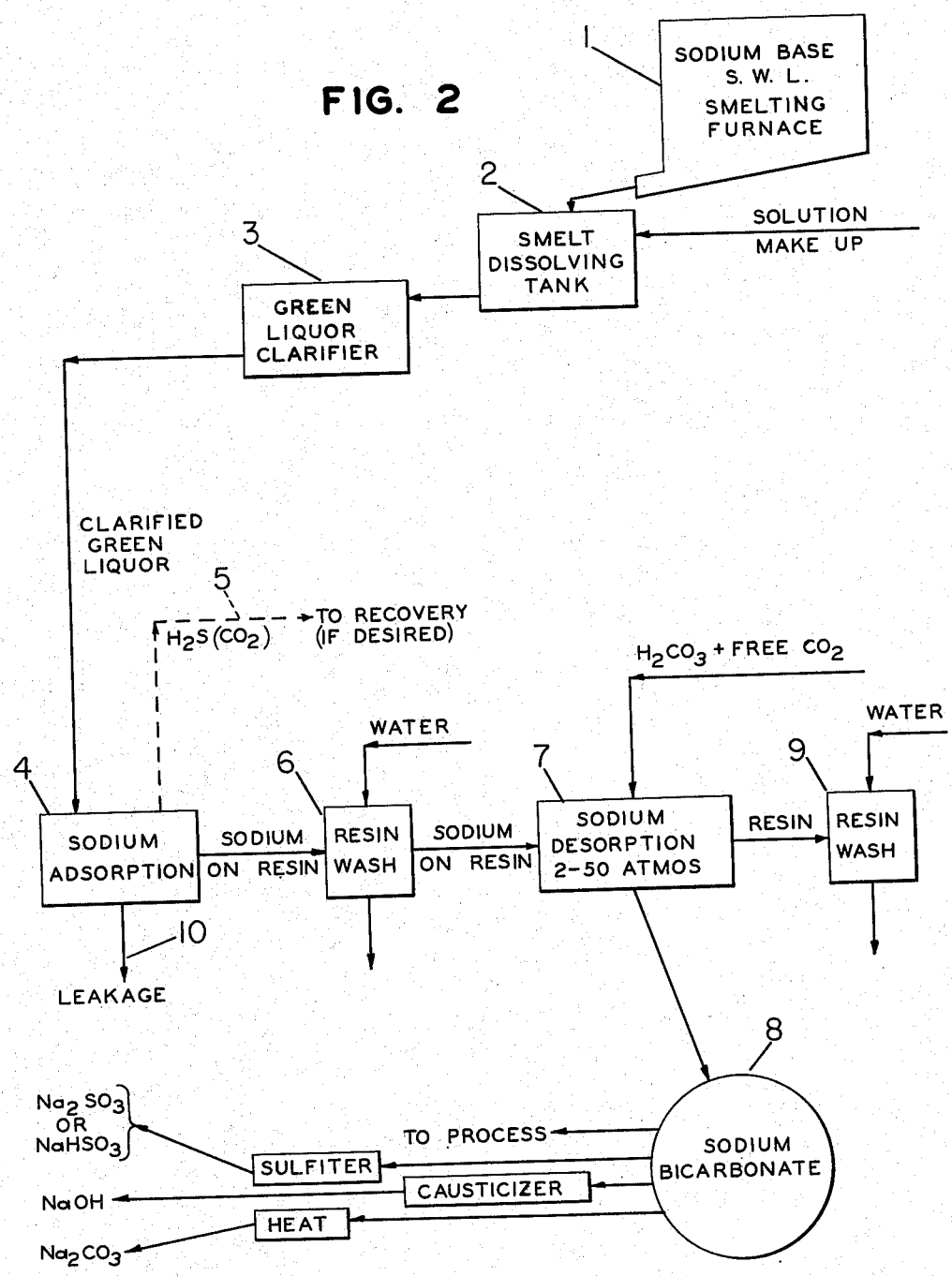

The accompanying drawings are flow sheets of operations embodying the invention, in which Fig. 1 represents a general application of the process, and Fig. 2 represents an operation in the recovery and production of chemicals used in the making of wood pulp.

Without limiting the process to any specific details, the preparation of sodium bicarbonate will be described by outlining a specific recovery cycle with reference to Fig. 1 as follows:

The general operation illustrated in Fig. 1 is carried out by treating a sodium sulfide and carbonate solution from any suitable source such as naturally occurring mineral deposits or brines or smelts from pulping operations with the aforementioned resin to cause the alkali metal to be adsorbed on the resin and the weak acid (i. e. $H_2S$ and/or $CO_2$) to be liberated in gaseous form. The adsorption may be carried out at temperatures of 60°–90° C. and normal pressure. The liquid portion of the solution is discarded or otherwise treated depending on its composition. The resin with its contained alkali metal may be washed if desired and is then treated with carbonic acid under pressure, preferably a carbon dioxide pressure of 2–50 atmospheres. As a result of the reaction with carbonic acid, the resin is regenerated for reuse and alkali metal bicarbonate is formed. The carbonic acid may be from the alkali metal absorbing and gas liberating stage or entirely or partly from an independent source.

Fig. 2 illustrates the treatment of combined waste liquor, recovered as an effluent from the successive acid sulfite and alkaline digestion of cellulosic substances, which is concentrated to at least 50% total solids content in conventional multiple-effect evaporators and fired in a smelting type recovery furnace (1). This furnace may be similar to the conventional units now used in the kraft and soda pulp mills throughout the industry. When operated under reducing conditions in the smelting zone (e. g. with high temperatures and limited excess air), the furnace will generate steam and yield a "smelt" of fused soda salts. This smelt flows from the furnace and may, for example, be quenched or otherwise dissolved (2) in water or some suitable effluent solution from the process to yield a characteristic "green liquor" containing essentially sodium sulfide with smaller amounts of sodium carbonate, sodium sulfate and sodium thiosulfate. Following clarification in conventional clarification equipment part or all of the green liquor is diverted to the ion exchange plant for the production of sodium salts of carbonic acid.

A suitable resin (for example, the weakly acidic phenolic hydroxyl or carboxylic acid type) in hydrogen form is contacted with the proper amount of smelt solution. This may be accomplished in a number of ways, as for example by passing the solution through a bed of the resin or by adding the resin to the solution either batchwise or in a continuous manner, later separating the resin from the solution by mechanical means. The conditions of this treatment are not critical in any way with regards to time, temperature, or solution concentration, however a high solution concentration (100 grams equivalent $Na_2O$ per liter) speeds the reaction and permits a high resin capacity. Since adsorption of the soda (4) is accompanied by the spontaneous evolution of the corresponding free acids, $H_2S$ and $H_2CO_3$ (5), the reaction may conveniently and advantageously be carried out at an elevated temperature of 60–90° C., which approximates the temperature of the green liquor from the clarifiers. This elevated temperature reduces the solubility of the volatile product gases, thereby accelerating the reaction and improving the effective capacity of the resin.

However, it may be noted that use of green liquor containing sodium in excess of the capacity of the resin increases the driving force and the effective capacity of the resin. Under some conditions, it will frequently be desirable to operate in this manner, either returning the "leakage" containing unreacted sulfide and carbonate to the process for dissolving additional smelt or using it directly in the preparation of alkaline digestion liquor.

The resin containing the adsorbed sodium is washed by displacement (6) to remove excess smelt solution. The washed resin is then treated with an excess of carbonic acid solution under carbon dioxide pressure which effects regeneration of the resin and desorption of the sodium (7) to form an effluent containing sodium bicarbonate and free carbonic acid (8). The excess carbonic acid may be readily removed by heating to give bicarbonate which may be decomposed to give normal carbonate if desired.

Subjecting the resin to a brief wash to remove residual carbonic acid (9) completes the cycle and leaves the resin ready for reuse.

The use to which the sodium carbonate or bicarbonate product of the ion exchange treatment is put will depend somewhat on the particular pulping process used. Depending on the digestion solutions desired, the carbonate or bicarbonate solution may be used as such for alkaline cooking liquor make-up, converted to caustic soda by causticization, or treated with sulfur dioxide to produce sodium sulfite for use in alkaline cooking or refining.

One important application of the ion exchange treatment is as a means of reducing the sulfidity of alkaline cooking liquor. Black liquor from a conventional kraft cook following strong $SO_2$ or acid sulfite prehydrolysis would contain much more sulfur than normal black liquor, and it would be expected that the smelt sulfidity might be higher than desired for optimum cooking. By use of our invention the sulfidity of the green liquor may be reduced to any desired value by ion exchange treatment of a portion of the smelt. The liberated $H_2S$ can be oxidized to $SO_2$ and utilized elsewhere in the process in the form of sulfurous acid, sodium bisulfite or in digestion liquor as sodium sulfite.

In the application of the ion exchange process described above, the treatment of the leakage from the soda adsorption step (10) is largely dictated by its composition which, in turn, is a function of the particular mill, the furnace operation, and the ion exchange cycle. In general, the main components other than unadsorbed sulfides or carbonates will be sodium sulfate, sodium thiosulfate, and traces of dissolved gases (e. g. $H_2S$ and $CO_2$). If the mill uses salt water floated logs, chloride will also be a major constituent. The dissolved gases may be very readily removed by stripping if desired. However, due to the limited solubility, the amount of gas present is very small. If the inactive salts in the leakage represent an appreciable soda value, economic considerations will necessitate their being retained in the system. Where the nature and amount of the salts are such that no detrimental effects will be incurred in the cooking cycle, the leakage may be used to make-up carbonic acid solution and used as regenerant for the resin or may be simply added to the cooking liquor as a diluent. The subsequent treatment in the furnace reestablishes the equilibrium through reduction of a large part of the sulfate and thiosulfate to sulfide.

Recovery of the soda values in the leakage may also be accomplished either by evaporation of the excess water and return of the concentrated solution to the furnace or by treatment with an ion exchange resin capable of adsorbing the sodium from the remaining salts.

Returning the leakage to the smelt dissolving tank is practical, especially where the residual salt concentration is low. However, this would result in an accumulation of the inactive salts in the cycle and would necessitate provision for the removal of a portion of these salts or bleeding off a portion of the solution each cycle in order to prevent precipitatoin of soda compounds due to concentrations exceeding the solubility limits.

The gas evolved during the sodium adsorption step consists of $H_2S$ and $CO_2$, in mol ratio substantially equal to the mol ratio of sulfide to carbonate in the green liquor. Where the ratio of sulfide to carbonate in the smelt is such that the evolved gases are combustible, it will generally be advantageous to burn the hydrogen sulfide to sulfur dioxide for use in the preparation of the acid sulfite digestion liquor or sodium sulfite. Where the evolved gases are non-combustible, one of the known adsorption-desorption processes may be used to concentrate the hydrogen sulfide to permit burning.

In the ion exchange process washing of the resin between steps may be carried out in a manner familiar to the art whereby a strong and a weak fraction are recovered, the strong fraction being added to the effluent from the preceding stage and the weak fraction being stored for the first wash liquor of the subsequent cycle.

Certain pulping applications require use of neutral sodium sulfite rather than sodium bisulfite. These include the so-called neutral sulfite process as well as processes using strongly alkaline cooking liquors. Examples of such liquors would include mixtures essentially consisting of $$NaOH + Na_2SO_3, \quad NaOH + Na_2S + Na_2SO_3,$$
$$Na_2CO_3 + Na_2SO_3, \quad Na_2CO_3 + Na_2S + Na_2SO_3$$

and other combinations.

Neutral sodium sulfite can be conveniently prepared for such uses by reacting sodium bicarbonate or sodium carbonate recovered in the manner heretofore described with sodium bisulfite or sulfur dioxide at an elevated temperature.

In another modification our process may be advantageously applied to the preparation of pure chemicals from naturally occurring mineral deposits or brines containing sodium salts of weakly acidic volatile acids. An analysis of one such deposit is shown below:

*Analysis of natural brine from Soap Lake, Washington*

| | Weight percent of T. S. |
|---|---|
| Sodium carbonate | 33.9 |
| Sodium bicarbonate | 16.2 |
| Sodium sulfate | 26.6 |
| Sodium chloride | 20.1 |
| Minor constituents | 3.2 |
| | 100.0 |

Whereas separation of these salts by crystallization techniques would present considerable difficulty, the carbonate and bicarbonate fraction of such a brine can be readily and simply recovered in pure form as sodium bicarbonate by application of our ion exchange process. This may be readily decomposed to sodium carbonate by conventional methods.

In such a process, in order to utilize the maximum effective capacity of the resin, it will usually be desirable to regenerate with solutions containing carbon dioxide in excess of the theoretically required amount. Following regeneration the resulting effluents may be stripped of the excess volatile constituent to produce solutions substantially free of excess regenerant. The carbon dioxide so removed, along with the carbon dioxide evolved during the soda adsorption step, would be recycled by use in the preparation of carbonic acid for reuse in the process.

In another modification of our process sodium sulfate may be smelted with coal or other carbonaceous matter to yield a smelt containing sodium sulfide and carbonate. This may be dissolved and readily converted to sodium bicarbonate by our process in a manner similar to the preparation of sodium bicarbonate from the smelt resulting from the combustion of soda-base waste liquor. In that our process effects a purification, extremely impure sodium sulfate may be used as a raw material. In fact, naturally occurring sodium sulfate or chemical wastes containing sodium sulfate may be used even in the presence of considerable contaminants such as chlorides, etc.

Examples illustrating the process of the invention, as well as the preparation of some weakly acidic resins, are given below.

EXAMPLE I

*Preparation of phenolic hydroxyl resin*

1500 grams of quebracho tannin were dissolved in 1500 ml. of water in an autoclave and 609 ml. of formalin and 15 ml. of concentrated hydrochloric acid were added. The mixture was then heated with a steam jacket, with a steam pressure of 115 lbs./sq. in. in the jacket. Heating was continued for 3 hours, during which time the temperature reached 135° C. in the autoclave. The mass was then removed from the autoclave, dried at low temperature and heated at 105° C. for a total of 36 hours. The product was then ground and screened to remove fines.

EXAMPLE II

A commercial resin containing carboxylic acid cation exchange centers (sold under the trade name of Amberlite IRC-50) has also been used in the practice of the invention.

Application of these resins to the process of our invention is illustrated by the following:

200 ml. of the above mentioned wet resins in the hydrogen form were slurried separately with 200 ml. of solution containing 100 gm. sodium per liter, 85% of which was present as sulfide and carbonate; the balance being present as sulfate, chloride, thiosulfate, and sulfite. The reactions were allowed to proceed 15 minutes at 82° C. and atmospheric pressure, during which time hydrogen sulfide and carbon dioxide were evolved from the solutions and sodium was adsorbed on the resins. The resins were then separated from the solutions, and washed thoroughly in accordance with standard practice for washing ion exchange resins. Each resin was then divided into two fractions which were separately treated (regenerated) in the following manner:

(a) One fraction was slurried with 500 ml. of a mineral acid for 15 minutes at 25° C. and atmospheric pressure. The product solution containing the recovered sodium was drained off and the resin was washed, whereupon it was ready for reuse.

(b) The second fraction was treated along with 4 liters of water for two hours under 270 p. s. i. g. $CO_2$ pressure, following which the product solution containing the recovered sodium was drained off and the resin was washed, whereupon it was ready for reuse.

| Resin | Sodium Adsorbed by 100 ml. Wet regenerated Resin | Sodium Recovered by Regeneration with Mineral Acid | Sodium Recovered by Regeneration With Carbonic Acid at 18.4 Atmos. $CO_2$ Press. |
|---|---|---|---|
| | grams | grams | grams |
| Phenolic Hydroxyl Resin (Prepared as described above) | [1] 2.8<br>[2] 2.1 | 2.92<br>2.16 | 2.72<br>2.24 |
| Carboxylic Acid Resin ("Amberlite IRC-50") | [1] 7.4 | 7.4 | 3.8 |

[1] Sodium adsorption at 82° C.
[2] Sodium adsorption at 26° C.

We claim:

1. In a process for the preparation of sodium salts, the improvement which comprises bringing an aqueous solution containing at least one sodium salt of a weakly acidic volatile acid of the group consisting of sodium sulfide and sodium carbonate into reacting contact with a cation exchange resin having active exchange centers which are weakly acidic groups in hydrogen form, evolving a substantial portion of the volatile acid in gaseous form and adsorbing sodium on the resin, and contacting the resin containing adsorbed sodium with carbonic acid in solution under a carbon dioxide pressure of from 2 to 50 atmospheres to form a sodium salt of carbonic acid and regenerate the resin.

2. In the process of claim 1, using a resin having weakly acidic groups selected from the class consisting of phenolic hydroxyl groups and carboxylic acid groups.

3. In the process of claim 1, using an ion exchange resin of the group consisting of a condensation product of formaldehyde with a phlobatannin selected from the group consisting of quebracho tannin and hemlock tannin.

4. In the process of claim 1, the aqueous solution also containing a sodium salt of a relatively non-volatile acid.

5. In the process of claim 1, forming sodium bicarbonate as the only sodium salt formed.

6. In the process of claim 1, the aqueous solution containing a sodium salt in an amount substantially in excess of the capacity of the resin.

7. In the preparation of wood pulp, the process for recovering chemicals which comprises combusting waste liquor from a sulfite digestion of wood to yield a smelt containing sodium salts of weakly acidic volatile acids including hydrogen sulfide, forming an aqueous solution of said smelt, bringing into reacting contact said aqueous solution and a cation exchange resin having active exchange centers which are substantially weakly acidic groups selected from the class consisting of phenolic hydroxyl groups and carboxylic acid groups and which are in hydrogen form, evolving a substantial portion of said volatile acids as gas and adsorbing sodium on the resin, contacting the resin containing adsorbed sodium with carbonic acid under a carbon dioxide pressure of from 2 to 50 atmospheres, and forming a solution containing a sodium salt of carbonic acid.

8. In the preparation of wood pulp according to claim 7, forming a smelt by combining waste liquors from successive sulfite and alkaline digestions of wood.

9. In the preparation of wood pulp according to claim 7, adding at least a portion of the sodium salt of carbonic acid to the smelt solution to reduce the sulfidity.

KENNETH RUSSELL GRAY.
HARTZELL LANCE CROSBY.

References Cited in the file of this patent

UNITED STATES PATENTS

| Number | Name | Date |
| --- | --- | --- |
| 1,937,995 | Thomsen | Dec. 5, 1933 |
| 2,104,501 | Adams et al. | Jan. 4, 1938 |
| 2,108,783 | Smith | Feb. 15, 1938 |
| 2,191,853 | Holms | Feb. 27, 1940 |
| 2,198,378 | Ellis | Apr. 23, 1940 |
| 2,198,381 | Ellis | Apr. 23, 1940 |
| 2,240,116 | Holmes | Apr. 29, 1941 |
| 2,409,861 | Hunter | Oct. 22, 1946 |

FOREIGN PATENTS

| Number | Country | Date |
| --- | --- | --- |
| 477,744 | Great Britain | Jan. 5, 1938 |
| 521,207 | Great Britain | May 15, 1940 |
| 544,853 | Great Britain | Apr. 30, 1942 |
| 118,486 | Australia | May 18, 1944 |

OTHER REFERENCES

"The Industrial Development of Searles Lake Brines" by J. E. Teeple, page 18, 1929 Ed. Chem. Catalog Co., Inc., N. Y.

"Ion Exchange," pages 123–127. Chem. Eng., July 1947.

"Ion Exchange Resins" by Robert Kunin and Robert J. Myers, page 69. John Wiley and Sons, Inc., N. Y.